3,013,889
PIGMENT-SUBSTRATE MIXTURES
James D. Stepp, Huntington, W. Va., assignor to Standard Ultramarine & Color Co., Huntington, W. Va., a corporation of West Virginia
No Drawing. Filed May 28, 1958, Ser. No. 738,589
6 Claims. (Cl. 106—289)

This invention relates to pigment-substrate mixtures and, more particularly, to phthalocyanine pigment-substrate mixtures having a soft texture and to the method of their manufacture.

The coloring of solid synthetic and natural resin compositions conventionally is effected by a physical blending of pigments with the resin material, in for example, a heavy mixer or a heated roll mill. In order to obtain a high color value from the pigment and a resin product of uniform color, pigments of small particle size desirably are employed. Additionally, pigments which readily may be dispersed throughout the resin are essential for commercial operation.

While phthalocyanine pigments, per se, may be employed to color resin compositions, they are extremely difficult to disperse in resins. In an effort to obtain a phthalocyanine pigment which is more easily dispersible than the pigments, per se, phthalocyanine-substrate mixtures, commonly referred to as pigment lakes, have been employed. In order to gain an intimate admixture of pigment and substrate water generally has been utilized as a mixing medium, and the slurry of pigment and substrate is subjected to simple stirring or colloid milling. The use of water eliminates the tendency of the materials to dust and escape from the mixing apparatus. Moreover, water is substantially inert toward phthalocyanines and does not effect the change of crystalline structure with the accompanying change of shade toward green that occurs if an organic liquid is employed. While simple stirring or colloid milling of aqueous slurries of phthalocyanine and substrate produce pigment lakes which are commercial, nevertheless, they are still somewhat difficult to disperse in resins. The utilization of surfactants or dispersants aid somewhat in the dispersion of pigment lakes but they often adversely effect the strength and other properties of the finished product.

Accordingly, it is a primary object of this invention, to provide a phthalocyanine pigment lake which is excellently suited for incorporation into solid resin compositions.

It is a more specific object of this invention to produce a phthalocyanine pigment lake of high color value and soft texture.

It is a further object of this invention to provide a method of producing a phthalocyanine pigment lake of high color value and soft texture.

According to this invention, there is provided a phthalocyanine pigment-substrate mixture produced by the process which comprises forming a water slurry of finely divided phthalocyanine pigment and a finely divided water-insoluble substrate, subjecting the mixture to extensive ball mill grinding, and drying the phthalocyanine pigment-substrate mixture to particulate form. The invention further contemplates the method of manufacturing the pigment-substrate mixtures.

The pigment lakes of this invention exhibit a uniform physical appearance, have an excellent soft texture and may be dispersed in solid resin material with exceptional ease. Since resin milling to disperse pigments is often effected at elevated temperatures which may harm the pigment if extensive milling is required, the ease of dispersion of the pigment lakes of this invention permits much shorter resin milling times and substantially eliminates the danger of harming the pigment during the dispersing operation.

The finely divided phthalocyanine pigments contemplated by this invention constitute either the metal free phthalocyanines or the metal-containing phthalocyanines such as copper, iron, or tin phthalocyanines and the like. Copper phthalocyanines, and particularly copper phthalocyanine blue pigments, are especially appropriate pigments for the practice of this invention.

The phthalocyanine pigment may be reduced to the requisite finely divided form by any of the conventional methods known to the art. Thus, the crude phthalocyanine may be acid-pasted or subjected to a salt milling operation to produce the finely divided pigment starting materials of this invention. Other known methods of producing finely divided phthalocyanine pigments also may be employed.

The water insoluble substrate materials contemplated by the present invention include materials such as calcium carbonate, magnesium carbonate, calcium sulfate, magnesium sulfate, and titanium dioxide. As employed herein, "water insoluble" refers to materials which exhibit a solubility in water at 25° C. of less than about 0.5 gram per liter. Appropriate substrate materials are readily available in finely divided form but, if desired, the particle size of the substrate material may be reduced still further by simple mechanical grinding.

The finely divided phthalocyanine pigment and finely divided substrate are employed in amounts sufficient to provide substrate in an amount which is at least equal to the weight of the phthalocyanine pigment employed. Thus, the weight ratio of dry phthalocyanine pigment to dry substrate appropriately may vary from about 1:1 to about 1:5. Weight ratios within the range of about 1:2 to about 1:4 are particularly appropriate for the production of pigment lakes, and optimum properties may be obtained with a weight ratio of about 1:3.

The amount of water employed in the pigment-substrate slurry is not critical to the practice of the invention so long as the water is sufficient to form a fluid slurry. Water to pigment-substrate weight ratios of from about 2:1 to about 5:1 and above have been successfully employed.

Ball milling requisite to produce the pigment lakes of the present invention appropriately may be carried out at room temperature. The pebbles or steel balls may vary in size from ⅛ inch to about 1 inch in diameter. Pebbles generally are preferred for the practice of the invention since pebbles present no danger of contaminating the pigment lake. Rotational speeds of from about 20 revolutions to about 50 revolutions per minute may be employed in conventional ball mills having diameters from about 0.3 ft. to about 6 ft. Since ball milling machines are well known in the art, they will not further be described here.

The duration of the milling will be somewhat dependent upon the size of the balls employed and upon the rotational speed of the mill. It has been found, however, that milling times of from about 8 to about 13 hours provide excellent pigment lakes. Milling times of from about 10 to about 12 hours provide particularly appropriate pigment lakes.

Following the ball milling, the phthalocyanine-substrate mixture is dried to particulate form. Thus, the water slurry may be filtered, washed, dried and pulverized in a hammer mill through a fine screen. Alternatively, the pigment lake may be spray dried by spraying the slurry into a circulating current of hot air and collecting the produce in a cyclone separator. Simple evaporation followed by pulverization through a fine screen in a hammer mill also provides a satisfactory product.

The pigment lakes of this invention appropriately may be incorporated into a wide variety of synthetic and natural resin bases such as polyethylene, polyvinyl chloride, polyvinyl acetate, polystyrene, asphalt and the like.

The pigment lakes of this invention are characterized by an ability to be uniformly dispersed throughout a vinyl chloride resin when 0.1% by weight of pigment lake based on the weight of the resin is subjected to a two roll milling operation at 320° F. for three minutes. The testing procedure is particularly described in Example I below.

In order more fully to define the practice of the present invention, a preferred specific embodiment will be described.

One part, dry basis, of a wet, acid-pasted, copper phthalocyanine press cake is combined with 20 parts of water and charged to a ball mill containing about 50 parts of flint pebbles. The pH of the mixture is adjusted to about 8.0 with ammonia and 3 parts of finely divided calcium carbonate are added. The charge is milled at about 30 r.p.m. for about 12 hours. At the end of the 12 hour period, the mill is emptied and the slurry is filtered. Drying at about 60° C. will produce approximately 4 parts of pigment lake which is subjected to a final pulverization in a hammer mill. The pigment lake so produced, will exhibit a soft texture and will be characterized by an exceptional ease of dispersion in resin materials.

The following examples are presented for purposes of more specific illustration of this invention. It is not intended that the scope of the invention be limited by the specific embodiments described.

*Example I*

Fifteen parts, dry basis, of a wet, acid pasted, chlorine-free, copper phthalocyanine press cake, and 300 parts water were charged to a ball mill containing 800 parts flint pebbles. The pH was adjusted to between 8.0 and 8.5 with ammonia. Forty-five parts finely divided whiting (natural calcium carbonate) were added and the charge was milled for ten hours at 85 r.p.m. The mill was emptied, the slurry was filtered and the filter cake was dried at 55–60° C., yielding 59 parts of pigment lake. The dried lake was pulverized in a hammer mill through a fine screen.

A synthetic resin premix was formed containing 123 parts of vinyl chloride (Goodyear Pliovic C–14–1029 resin), 55.2 parts of dioctyl phthalate, 6.1 parts of polyester plastizer (Rohm & Haas G–62), 12.3 parts of titanium dioxide (Du Pont R–510), 2.5 parts of a barium-cadmium soap heat and light stabilizer (Ferro #1825) and 0.9 part of a cadmium organic heat and light stabilizer (Ferro #203). In order to test the ease of dispersion 0.2 part of pigment was added to the premix and the mixture was blended in a two roll plastic mill having 6″ x 13″ differential rolls with a 1.4:1.0 ratio and a mill clearance of 0.040″. The mill was heated to 320° F. and the premix was bonded on the mill cut and allowed to sheet out smoothly. The dry pigment lake then was added slowly and the stock was milled for three minutes. Following the milling, the synthetic resin mixture was smoothed out on the roll for 30 seconds and then removed and allowed to cool. A portion of the synthetic material then was returned to the mill and milled under the above conditions for an additional two minutes.

Cross mounts were made of the three and five minute films by pressing at 320° F. and 5000 p.s.i. The tendency to streak was observed by examining the cross mount of the three minute film and the rate of strength development was observed by comparing the difference in the strengths of the three minute and the five minute cross counts.

The phthalocyanine pigment lake manufactured as described above produced a three minute film which was entirely free from streaks. Moreover, the pigment lake gained only 5% strength between the three and five minute samples.

A similar pigment lake prepared by subjecting the same materials to simple stirring rather than ball milling exhibited a great number of streaks in the three minute sample and was about 25% weak to the ball milled three minute sample. The prior art pigment lake five minute sample showed a 25% increase in strength over the three minute sample.

*Example II*

Ten parts, dry basis, of wet, acid-pasted chlorine free copper phthalocyanine and 100 parts of water were charged to a ball mill containing 400 parts of flint pebbles. The pH was adjusted to about 8.5 and 30 parts of finely divided calcium carbonate were added to the slurry. The charge was milled at 29 r.p.m. for 8 hours, then filtered, dried at about 60° C. and pulverized.

When subjected to the test outlined in Example I, the three minute film sample showed substantially no streaks and demonstrated a strength comparable to the strength of the five minute sample.

*Example III*

Example II was repeated employing a milling time of 10 hours. The pigment lake so produced gave satisfactory results when subjected to the test of Example I.

*Example IV*

The method of Example II was repeated employing a milling time of 12 hours. The pigment lake so produced exhibited a marked ease of dispersion and excellent strength when subjected to the test of Example I. The results obtained indicated that an optimum pigment lake was obtained at the 12 hour milling time.

*Example V*

The process of Example II was repeated employing a milling time of 14 hours. When the pigment lake was tested in the method of Example I, the three minute sample gave evidence of streaking. This tendency became increasingly more pronounced as longer milling times were employed in the production of the pigment.

*Example VI*

The process of Example I was repeated employing a phthalocyanine green press cake. The finished product exhibited the same ease of dispersion as the product of Example I.

*Example VII*

The process of Example IV was repeated and the ball milled slurry was divided into three portions. One portion was filtered, dried and pulverized; the second portion was dried by evaporation and pulverized, and the third portion was dried by spraying the slurry into a current of hot air and collecting the product in a cyclone separator. The three pigment lakes so produced were found to give comparable results when subjected to the test of Example I.

A one quart, 4″ diameter ball mill was employed in Example I and a 60 gallon 27″ diameter ball mill was employed in Example II.

Since modifications of the invention will be apparent to those skilled in the art, the invention is intended to be limited only by the appended claims.

I claim:

1. A phthalocyanine pigment-substrate mixture of soft texture and high color value having the characterization of being readily and rapidly dispersed in synthetic and natural resin bases and when so incorporated in said bases having a high rate of strength development and exhibiting substantially no streaks, said pigment-substrate mixture being produced by forming a fluid water slurry of at least about 2 parts by weight of water to about 1 part by weight of said pigment-substrate mixture, of finely divided phthalocyanine-pigment and from about 1 to about 5 parts by weight of said pigment of a finely divided water-insoluble substrate, adjusting the pH to from about 8 to about 8.5, milling said slurry in a ball mill for a period of from about 8 to about 13 hours, and drying the phthalocyanine-substrate mixture and recovering it in particulate form.

2. The phthalocyanine pigment-substrate mixture of claim 1 produced by ball mill grinding for a period of from about 10 to about 12 hours.

3. The phthalocyanine pigment-substrate mixture of claim 1 wherein the weight ratio of pigment to substrate is within the range of about 1:2 to about 1:4.

4. A process for producing a phthalocyanine pigment-substrate mixture of soft texture and high color value which comprises forming a fluid water slurry of finely divided phthalocyanine pigment and from about 1 to about 5 parts by weight based on the pigment of a finely divided water-insoluble substrate, the proportion of water to said mixture being at least about 2:1, adjusting the pH of the mixture to from about 8 to about 8.5, milling said slurry in a ball mill for a period of from about 8 hours to about 13 hours, drying the mixture and recovering it in particulate form, said phthalocyanine pigment having substantially unchanged crystalline structure of the original phthalocyanine pigment added to said mixture.

5. The process of claim 4 wherein the ball mill grinding is carried out for a period of from about 10 to about 12 hours.

6. The process of claim 4 wherein the weight ratio of phthalocyanine pigment to substrate is from about 1:2 to about 1:4.

References Cited in the file of this patent

UNITED STATES PATENTS

| | | |
|---|---|---|
| 2,007,980 | Neumann | July 16, 1935 |
| 2,402,167 | Lang et al. | June 18, 1946 |
| 2,452,606 | Siegel | Nov. 2, 1948 |
| 2,486,351 | Wiswall | Oct. 25, 1949 |
| 2,772,984 | Helfaer | Dec. 4, 1956 |